Patented Apr. 21, 1953

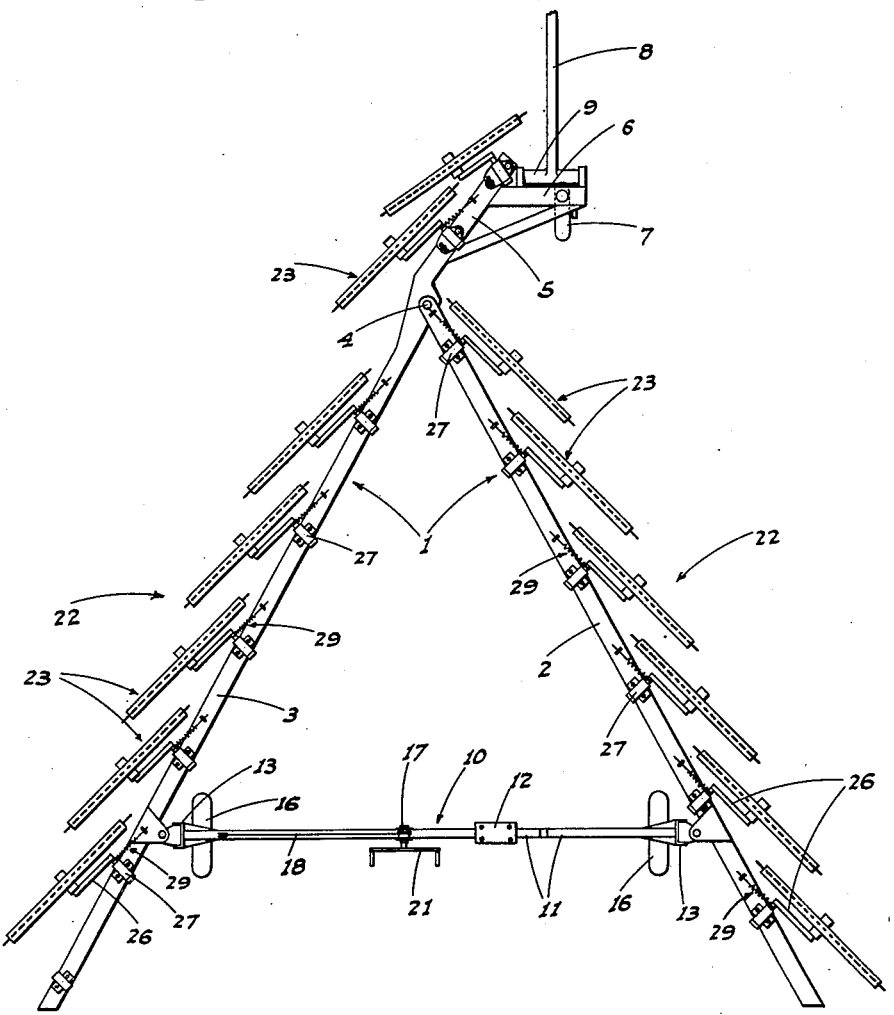

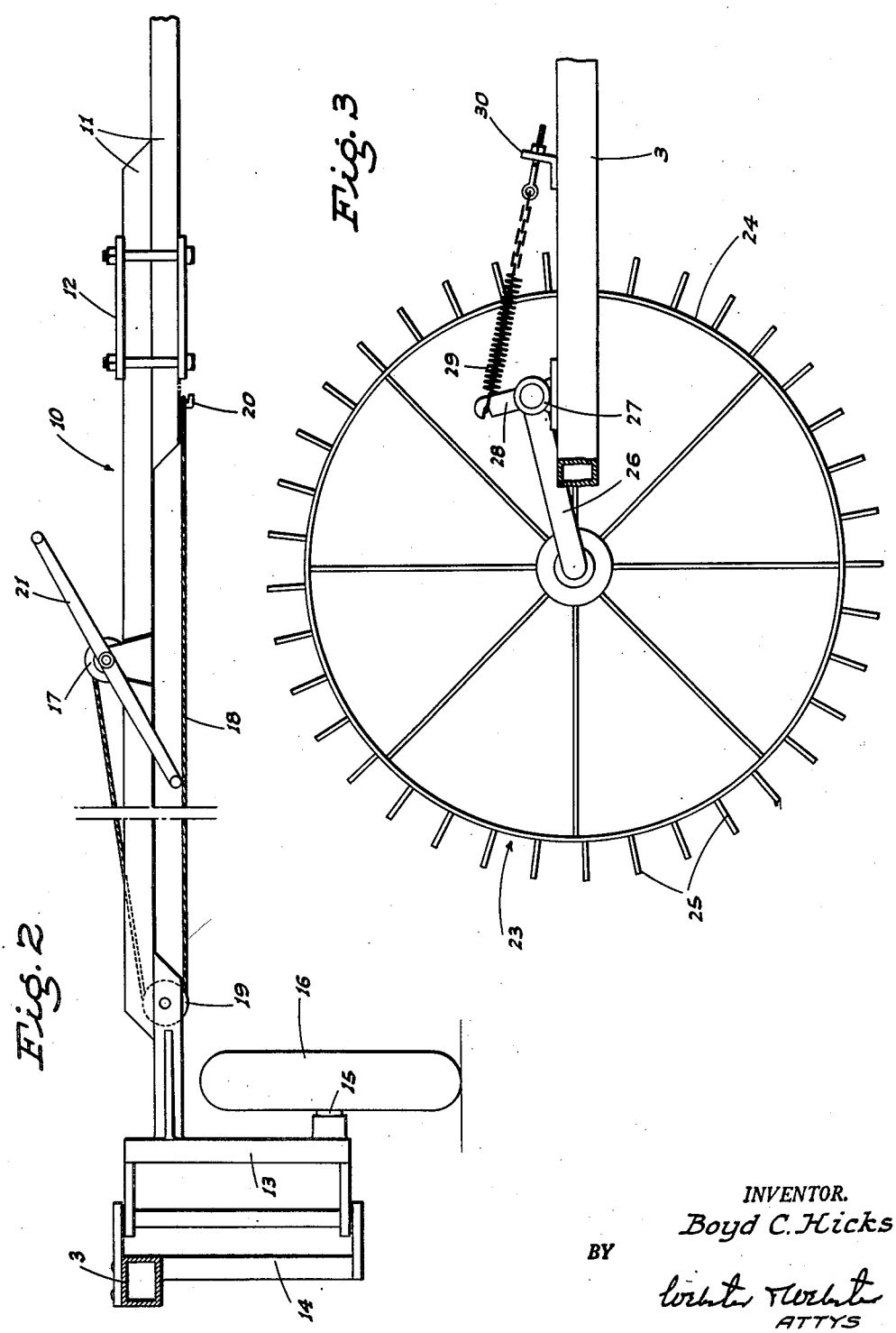

2,635,411

UNITED STATES PATENT OFFICE 2,635,411

AGRICULTURAL RAKE

Boyd C. Hicks, Patterson, Calif.

Application November 10, 1948, Serial No. 59,308

4 Claims. (Cl. 56—377)

This invention is directed to, and it is an object to provide an improved hay rake; the advantages including wide coverage on each path of travel, windrowing to opposite sides of the implement, and minimized side draft.

Another object of the invention is to provide a hay rake which comprises, in the main, a wheel supported V-frame including forwardly converging draft beams, and a row of overlapping rotary sweep type rake wheels on each draft beam in forward and inward diagonal relation to the line of draft whereby each such row progressively sweeps or rakes the hay in its path laterally outwardly toward a corresponding windrow.

A further object of the invention is to provide a hay rake, as in the preceding paragraph, wherein the forward or lead rake wheel of one row extends ahead, and into the path of, the lead rake wheel of the other row so that no center strip remains unraked as the implement moves forward.

An additional object of the invention is to provide a double acting hay rake, as above, which is adjustable in effective width; this being accomplished by altering the included angle between the forwardly converging draft beams.

It is also an object of the invention to provide a hay rake which is designed for ease and economy of manufacture, and for long service in the field, with a minimum of maintenance or repair.

A further object of the invention is to provide a practical and efficient agricultural rake, and one which will be exceedingly effective for the purpose for which it is designed.

These objects are accomplished by means of such structure and relative arrangement of parts as will fully appear by a perusal of the following specification and claims.

In the drawings:

Fig. 1 is a top plan view of the rake.

Fig. 2 is an enlarged fragmentary rear end elevation, partly in section, showing one of the rear wheel mounts and the adjustable tie bar.

Fig. 3 is an enlarged fragmentary side elevating, partly in section, of one of the rake wheels showing the corresponding mount therefor.

Referring now more particularly to the characters of reference on the drawings, the implement comprises a forwardly extending, horizontal V-frame, indicated generally at 1; such V-frame including a pair of forwardly projecting draft beams, indicated at 2 and 3, respectively.

The draft beam 2 is vertically pivotally connected at its forward end, as at 4, to the draft beam 3 at a point adjacent but short of the forward end of the latter.

At its forward end portion 5 the draft beam 3 is fitted with a rigid lateral arm 6 which projects ahead of the draft beam 2.

The lateral arm 6, which is in effect a portion of the V-frame 1, is supported by a caster wheel unit 7, and a draft tongue 8 extends forwardly from the arm 6, being secured to the latter by a vertical swing connection 9.

A transverse tie bar 10, which is adjustable in length, is connected between the rear end portions of the draft beams 3 in the following manner:

The tie bar 10 includes lapping bar sections 11 secured together by a releasable clamp and guide assembly 12; such assembly normally maintaining the tie bar 10 of a fixed length.

At opposite ends the bar sections 11 are fixed to vertical axis swing frames 13 pivotally mounted in laterally inwardly opening yokes 14 on the corresponding draft beam. Below the adjacent bar section 11, each swing frame 13 is fitted with a laterally inwardly projecting spindle 15 on which a ground engaging wheel 16 is journaled.

The caster wheel unit 7 at the front and the wheels 16 at the rear support the V-frame 1 for movement along the ground; the effective or working width of the implement being adjustable by varying the length of the tie bar 10. This is accomplished by loosening the releasable clamp and guide assembly and then sliding the bar sections 11 inwardly or outwardly as desired. To slide the bar sections 11 inwardly to reduce the length of the tie bar 10 and to lessen the working width of the implement, the following windlass arrangement is provided:

A windlass 17 is mounted on one of the bar sections 11, and a cable 18 runs from such windlass laterally outwardly over a sheave 19 and then returns to connect to the other bar section at an anchor point, as at 20. The windlass 17 includes a double-ended crank 21. Upon operation of the windlass 17 by the crank 21 to wind the cable 18 onto said windlass, the effective length of the lower run of such cable is shortened, increasing the lap between the bar sections 11 and thus decreasing the length of the tie bar 10 and the working width of the implement.

The draft beams 2 and 3 are each fitted, on the outside, with a row, indicated generally at 22, of overlapping, rotary sweep-type rake wheels 23; the wheels on each draft beam being mounted in forward and inward diagonal relation to the line of draft. Each rake wheel 23 is of substantial diameter and includes a rim 24 from which a multiplicity of teeth 25 radiate in equally spaced relation.

The rake wheels 23 are individually suspended or mounted on the corresponding draft beam 2 or 3, by means of a journal 27. An upstanding radial lever 28 is fixed on the inner leg of each crank arm 26 so that forward swinging of said lever 28 urges the corresponding rake wheel 23 upwardly. A counterbalancing spring unit 29 connects between each radial lever 28 adjacent the top thereof, and an anchor 30 at a forward point on the corresponding draft beam.

These counterbalancing spring units 29 are tensioned so as to cause the rake wheels 23 to float easily over the ground during the operation of the implement, which operation is as follows:

With the draft tongue 8 coupled to a tractor, the implement is drawn forward, and as such implement advances the rake wheels 23 rotate and each sweeps the hay which is in its path laterally outwardly, delivering such hay into the path of the next following wheel. From the trailing rake wheel 23 of each row 22 the raked hay is delivered as a windrow. It will therefore be evident that when the implement is in operation it covers a relatively wide path as it advances, forming a windrow on opposite sides of such implement. As a result the implement has high capacity, with a minimum of side draft. As previously explained, the working width of the implement is readily adjustable by altering the length of the tie bar 10. It should also be noted that the implement when in use does not leave any unraked center strip between the rows 2. This is for the reason that the row 22 on the draft beam 3 has rake wheels 23 on the forward end portion, as shown, at least one of said rake wheels being ahead and in the path of the lead rake wheel of the row 22 on the draft beam 2. Consequently there is an effective lapping of the rows 22 at their forward ends to prevent any center line being skipped.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An agricultural rake comprising a frame supported for movement along the ground, such frame comprising two draft beams pivoted together adjacent the longitudinal center line of the machine and diverging rearwardly and outwardly therefrom, one beam projecting beyond the other and intersecting such center line and rake assemblies mounted on each beam along substantially the full length thereof.

2. A rake as in claim 1 including a draft member connected with the forward end of the projecting beam and laterally out therefrom.

3. A rake as in claim 1 including adjustment means between the rear ends of the draft beams and operative to adjust the degree of divergency between such beams.

4. An agricultural rake comprising a frame supported for movement along the ground, said frame comprising two draft beams pivoted together adjacent the longitudinal center line of the machine and diverging rearwardly and outwardly from the pivot point, one beam projecting forwardly beyond the pivot point and intersecting such center line of the machine, rotary raking wheels disposed along one side of each beam rearwardly of the pivot point, and other rotary raking wheels disposed along one side of the projecting portion of said one beam and being effective to rake hay to one side of the machine from both sides of said center line of the machine forwardly of said pivot point and in the longitudinal plane of the transverse space between the foremost raking units on the rearwardly diverging beams.

BOYD C. HICKS.

References Cited in the file of this patent

UNITED STATES PATENTS

| Number | Name | Date |
|---|---|---|
| 2,371,076 | Stevens | Mar. 6, 1945 |
| 2,447,354 | Morrill | Aug. 17, 1948 |
| 2,459,961 | Pollard | Jan. 25, 1949 |
| 2,472,260 | Morrill | June 7, 1949 |

FOREIGN PATENTS

| Number | Country | Date |
|---|---|---|
| 107,342 | Austria | Sept. 26, 1927 |